United States Patent [19]
Chi

[11] Patent Number: 5,617,517
[45] Date of Patent: Apr. 1, 1997

[54] TWO-DIMENSIONAL METHOD AND SYSTEM FOR COMPRESSING BI-LEVEL IMAGES

[75] Inventor: Shan Chi, Santa Clara, Calif.

[73] Assignee: Seiko Epson Corporation, Tokyo, Japan

[21] Appl. No.: 309,018

[22] Filed: Sep. 20, 1994

[51] Int. Cl.$^6$ ............................................ G06K 15/00
[52] U.S. Cl. ........................... 395/114; 395/115; 395/112
[58] Field of Search ..................... 395/114, 112, 395/110, 101, 115, 116, 164, 165, 166; 382/244, 246, 239, 232, 305, 238, 233; 358/261.2, 430, 261.3, 432; 341/63, 67, 95, 87, 51, 106; 345/202, 203; 348/409

[56] References Cited

U.S. PATENT DOCUMENTS

| | | | |
|---|---|---|---|
| 4,464,650 | 8/1984 | Eastman et al. | 341/51 |
| 4,499,548 | 2/1985 | Beebe | 382/232 |
| 4,558,302 | 12/1985 | Welch | 341/51 |
| 4,694,352 | 9/1987 | Ina et al. | 358/426 |
| 4,701,745 | 10/1987 | Waterworth | 341/63 |
| 4,930,142 | 5/1990 | Whiting et al. | 375/376 |
| 4,996,690 | 2/1991 | George et al. | 371/37.1 |
| 5,003,307 | 3/1991 | Whiting et al. | 341/51 |
| 5,016,009 | 5/1991 | Whiting et al. | 341/67 |
| 5,046,027 | 9/1991 | Taaffe et al. | 395/164 |
| 5,047,955 | 9/1991 | Shope et al. | 395/116 |
| 5,060,286 | 10/1991 | Miller | 382/239 |
| 5,123,061 | 6/1992 | Pritchard | 382/233 |
| 5,126,739 | 6/1992 | Whiting et al. | 341/106 |
| 5,146,221 | 9/1992 | Whiting et al. | 341/67 |
| 5,274,472 | 12/1993 | Williams | 358/455 |
| 5,467,435 | 11/1995 | Douglas et al. | 395/114 |
| 5,471,563 | 11/1995 | Dennis et al. | 395/114 |

OTHER PUBLICATIONS

IBM, Technical Disclosure Bulletin; Jan. 1986; vol. 28 No. 8; pp. 1–2.
KDN Mar. 4, 1987, "Add-in facsimile boards enable users of PCs to transfer CAE graphics in real time" p. 53.
Geneva, 1980, amended at Malaga–Torremolinos, 1984, "Standardization Of Group 3 Facsimile Apparatus For Document Transmission" pp. 16–31.

Malaga–Torremolinos, 1984, "Facsimile Coding Schemes And Coding Control Functions For Group 4 Facsimile Apparatus" pp. 40–48.

*Primary Examiner*—Edward L. Coles, Sr.
*Assistant Examiner*—Dov Popovici
*Attorney, Agent, or Firm*—Eric B. Janofsky

[57] ABSTRACT

A two-dimensional compression method and system for compressing a bi-level bit-mapped image. The compression system reads a current row of data from the bit-mapped image and compares the current row with the row immediately preceding the current row, called the reference row. If a byte in the current row is equal to a corresponding byte in the reference row, then the byte is represented by a COPY mode and the byte is copied from the reference row to a compressed row. If the byte is not equal to the byte in the reference row, then the next byte in the current row is read and compared with the preceding byte. If the current byte equals the preceding byte, then the byte is represented by a REPEAT mode and copied to the compressed row along with a count of how many times to repeat the byte. If the current byte is not equal the preceding byte, then the byte is represented by a LITERAL mode and the byte is copied directly to the compressed row along with a count of how many bytes are to be copied. Each transition from one mode to another in the compressed row is assigned a variable-length mode code, and each count in the compressed row is assigned a variable-length count code. The current row, once compressed contains a sequences of triplets comprising a mode code followed by a length code, and optionally followed by one or more data bytes.

13 Claims, 4 Drawing Sheets

| PREVIOUS MODE 80 | CURRENT MODE 82 | MODE CODE 84 |
|---|---|---|
| C | --> R | 0 |
| C | --> L | 1 |
| R | --> R | 0 |
| R | --> L | 10 |
| R | --> C | 11 |
| L | --> C | 0 |
| L | --> R | 1 |

| COUNT <n> 90 | COUNT CODE 92 |
|---|---|
| 1 | 0 |
| 2 | 10 |
| 3 | 1100 |
| 4 | 1101 |
| 5 | 11110 |
| 6 | 111110 |
| 7 | 111111 |
| >7<255 | 1110<count byte> |
| >=255 | 1110 11111111... |

FIG. 6

| Byte | 0 | 1 | 2 | 3 | 4 | 5 |
|---|---|---|---|---|---|---|
| Reference row 100 | 00000000 | 00000000 | 00000000 | 00000000 | 00000000 | 00000000 |
| Current row 102 | 00000000 | 00000000 | 11111111 | 11111111 | 10101101 | 00000000 |
| Compressed Row 104 | C 2 | | R 1 11111111 | | L 1 10101101 | C 1 |
| | 11 10, 0 0 11111111, 10 0 10101101, 0 0 | | | | | |

FIG. 7

Compressed row 110    10 0 1101 1011, 0 10, 0 1100 1100 0010, 0 1111111 1110 0011

L 1 <0xdb>  C 2, R 3 <0xc2>  R 7 <0xe3>

Decompressed row 112 db 00 00 c2 c2 c2 e3 e3 e3 e3 e3 e3

FIG. 8

TWO-DIMENSIONAL METHOD AND SYSTEM FOR COMPRESSING BI-LEVEL IMAGES

BACKGROUND OF THE INVENTION

The present invention relates to data compression, and more specifically to a two-dimensional compression method and system for compressing bi-level bit-mapped images.

Rasterization is the process of converting data, such as ASCII text, into what is known as a bit-mapped image, which is a sequential collection of bits representing an image to be displayed on a computer screen. Each bit in a bit-mapped image corresponds to one pixel location on the screen, and each horizontal line of bit values in a bit-mapped image is known as a rasterline. Output devices capable of reproducing a bit-mapped image, such as line printers and pen plotters for example, are known as bi-level devices because these devices are capable of producing only two levels of gray at a single pixel location; white (or light grey) to represent paper, and black (or dark grey) to represent ink on the paper. The bit values in bi-level bit-mapped images are either 0, to display white, or 1, to display black.

Bit-mapped images are stored in a contiguous piece of computer memory called a frame buffer. The frame buffer is an array containing one memory bit for each pixel that the raster device is capable of printing. For example, for a 1024×1024 pixel image, the frame buffer requires 1,048,576 bits of memory. Although the cost of memory has decreased, the cost of memory continues to add significantly to the total cost of an output processing device, such as a conventional printer for instance. A conventional printer is equipped with sufficient memory and processing power to rasterize incoming data within the printer. Because of the added memory and processing power, a conventional printer is generally expensive. By reducing the size of the frame buffer, however, the total cost of a conventional printer may also be reduced.

One method for reducing the size of the frame buffer is to compress an incoming bit-mapped image inside the printer before storing the image in the frame buffer. In this method, the incoming bit-mapped image is first compressed by what is known as an encoder, and then stored in a smaller version of the frame buffer. Before the data in the frame buffer is printed, the data is decompressed by what is known as a decoder. The encoder and decoder are either implemented in software or hardware within the printer. In prior methods where the printer includes a hardware implementation of the encoder/decoder, the cost of the encoder/decoder is generally the same as the frame buffer memory that is saved. Therefore, such methods fail to reduce the total cost of the printer.

Another type of printer, which is much less expensive than a conventional printer, is referred to as a "dumb" printer. In a dumb printer, most if not all, of the rasterization of an incoming image is performed by a host device, such as a personal computer (PC). After a bit-mapped image is rasterized by the PC, the PC sends the bit-mapped image to the dumb printer via the PC's parallel port, and the dumb printer is only responsible for printing the bit-mapped image. A dumb printer is less expensive than a conventional printer because of the savings realized from using less memory and a smaller microprocessor (if one is used at all).

Since one bit corresponding to each pixel location in a bit-mapped image must be sent from the PC to the printer, one major issue concerning the use of a dumb printer is throughput between the PC and the printer. Since a bit-mapped image is sent over a parallel port to the printer, the speed at which data is printed can be bound by the speed of input/output devices of the PC. One method for increasing the throughput between the PC and the printer is to compress the amount of data that must pass through the parallel port of the PC. This may be accomplished by using an encoder to compress bit-mapped images in the PC, rather than the printer, and using a hardware implemented decoder in the printer to decompress the images before the images are printed. In one method, the encoder is implemented as an add-on board that is inserted in the PC. This method has not been widely used due to the disadvantages associated with the use of add-on PC boards. Furthermore, the printer containing the decoder is incompatible with Pcs that do not contain the add-on encoder board.

Besides implementation issues associated with compression methods, the following aspects of compression methods must also be examined: the speed at which a compression method compresses data; the compression ratio, which is the size of the compressed data compared with the size of the original data; and the complexity of the compression method. Many well-known compression methods exist. However, each method usually performs well either with byte-oriented data, such as ASCII text, or with bit-mapped images.

For byte-oriented data, the Lempel-Ziv algorithms "LZ1" and "LZ2", and Huffman coding compression methods are widely used. The LZ1 and LZ2 algorithms assign fixed-length codes to variable size input strings. LZ1 and LZ2 are used in the Consultative Committee for International Telephone and Telegraph (CCITT) V.42 data compression standard for use in switched network modems. LZ1 and LZ2 are also used for data storage, i.e.,in tape drives and hard disk drives.

Huffman coding is another method for compressing data in which individual elements found in the data are assigned a code based on the relative frequency of the elements where the most frequently occurring elements are assigned a code with the smallest number of bits. Usually, Huffman coding is used to compress text, with the coding based on letter frequency. A drawback to Huffman coding is that it requires two passes of the data to generate statistics and to create a table containing the assigned codes (which is later used for decompression).

For bit-mapped images, compression methods known as Run-length coding, and CCITT G3 and G4 algorithms are widely used. Run-length coding is a compression scheme that has long been used for facsimile and photo transmission to reduce the amount of data in a bit-mapped image. Run-length coding eliminates repetitive sequences of equal pixel values in each horizontal rasterline by partitioning each rasterline into a series of runs of pixels that have the same values. When images are made up of a few long length runs, run-length encoding can substantially reduce the amount of memory needed to store images. However, as the average run length decreases, the image storage size increases rapidly.

Both CCITT G3 and G4 were designed mainly for telecommunication where CCITT G4 is a one-dimensional compression algorithm and CCITT G3 is a two-dimensional compression algorithm. In one-dimensional compression methods, each row of bit-mapped image is compressed independently, while in two-dimensional compression methods, each row of the bit-mapped image is compressed as a function of the data contained in adjacent rows. CCITT G3 and G4 provide adequate compression ratios for bit-mapped images, but because both G3 and G4 operate on individual bits rather than bytes, the CCITT G3 and G4 algorithms are in general, quite complex and slow.

Due to the disadvantages of the compression methods described above, a well known compression scheme for bit-mapped images was developed or specifically for printers. This compression scheme is referred to as delta-row compression. In delta-row compression, each rasterline in a bit-mapped image is compressed by identifying a section of bytes in a row that is different from the preceding row. The section of bytes that differ from the preceding row are called delta data. A rasterline is then decompressed by a printer by using the immediately preceding row, which is called the reference row, and the delta data. The reference row is changed as indicated by the delta data to recreate a new row. This new decompressed row is then printed and becomes the new reference row.

In delta-row compression, a compressed rasterline is output as a sequence of command bytes and the delta (replacement) bytes. Each command contains the following: 1) the number of bytes to replace in the reference row, 2) the relative offset from the last unchanged byte in the reference row where the replacement bytes are to be positioned, and 3) the replacement bytes themselves. The command byte typically consists of eight bits, 0–7, where the upper three bits identify the number of replacement bytes and the lower five bits identify the offset. For example, assume a command byte contains the following data:

010 00111 11111111

The first three bits are the number of bytes to replace in the reference row (two), the next five bits indicate the offset (seven), and the following two bytes are replacement bytes. Thus, the replacement bytes will replace bytes 7 and 8 in the reference row when the new row is created.

Although delta-row compression is an improvement over other forms of compression when used with printer control language, delta-row compression uses a fixed format and therefore introduces unnecessary overhead. For example, in delta row compression, if a row is completely different from the reference row, then the entire row must be transmitted. Also, where the first byte of a row is different from the first byte of the reference row, the five-bit offset field is still used to indicate a relative offset of zero bytes. Furthermore, delta row compression uses a fixed bit field to represent the number of bytes to replace, and a separate replacement byte is included in the command even where the replacement bytes are identical.

SUMMARY OF THE INVENTION

Accordingly, it is an object of the present invention to provide an improved two-dimensional compression method and system for compressing bi-level bit-mapped images into variable-length mode codes and variable-length-count codes.

The present invention is a two-dimensional compression method and apparatus for compressing a bi-level bit-mapped image. The compression method and apparatus of the present invention reads a current row of data from the bit-mapped image and compares the current row with the row immediately preceding the current row, called the reference row. If a byte in the current row is equal to a corresponding byte in the reference row, then the byte is represented by a COPY mode and the byte is copied from the reference row to a compressed row. If the byte is not equal to the byte in the reference row, then the next byte in the current row is read and compared with the preceding byte. If the current byte equals the preceding byte, then the byte is represented by a REPEAT mode and copied to the compressed row along with a count of how many times to repeat the byte. If the current byte is not equal the preceding byte, then the byte is represented by a LITERAL mode and the byte is copied directly to the compressed row along with a count of how many bytes are to be copied. Each transition from one mode to another in the compressed row is assigned a variable-length mode code, and each count in the compressed row is assigned a variable-length count code. The current row, once compressed contains a sequences of triplets comprising a mode code followed by a length code, and optionally followed by one or more data bytes.

Other objects, features and advantages of the present invention will become apparent from the following detailed description when taken in conjunction with the accompanying drawings.

BRIEF DESCRIPTION OF THE DRAWINGS

The accompanying drawings, which are incorporated in and form a part of this specification, illustrate embodiments of the invention and, together with the following detailed description, serve to explain the principles of the invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 1:
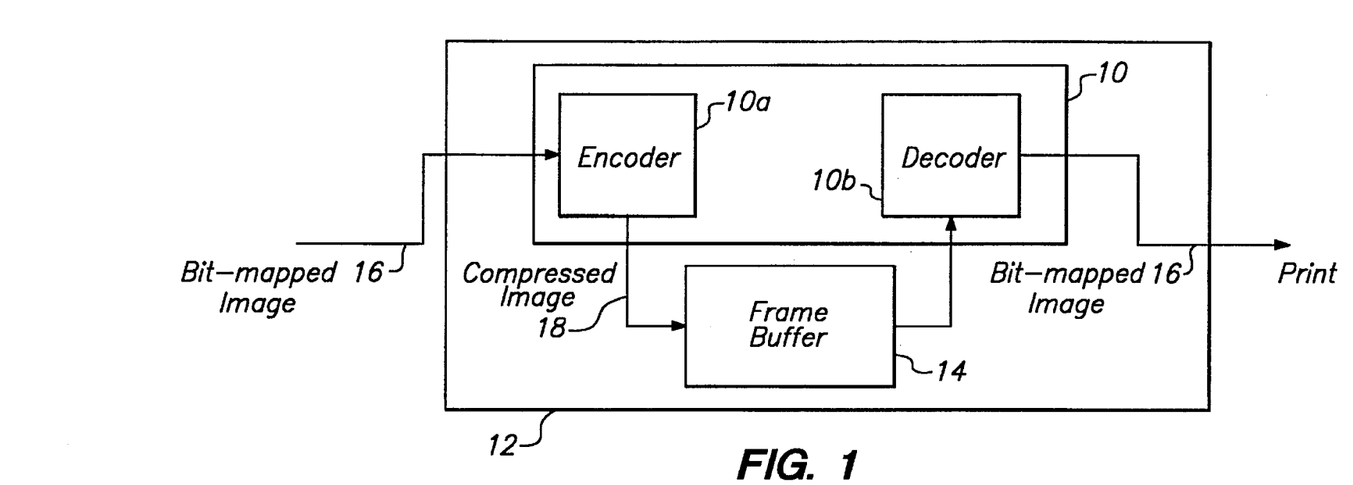
FIG. 1 is a block diagram depicting a data compression algorithm according to a preferred embodiment of the present invention.

FIG. 1 is a block diagram depicting a data compression algorithm 10 of the present invention, which, in a preferred embodiment, is utilized for printer frame memory compression. The data compression algorithm 10 is located within a conventional printer 12, which contains a frame buffer 14 for the temporary storage of an incoming bit-mapped image 16. The compression algorithm 10 includes two parts, an encoder 10a for compressing data, and a decoder 10b for decompressing data. The purpose of the compression algorithm 10 is to reduce the memory requirement of the frame buffer 14 by using the encoder 10a to compress the bit-mapped image 16 before the bit-mapped image 16 is stored in the frame buffer 14. The encoder 10a compresses the bit-mapped image 16, using methods explained below, to create a compressed image 18. The compressed image 18 is then transferred from the frame buffer 14 to the decoder 10b where the compressed image 18 is decompressed to recreate the bit-mapped image 16. After the compressed image 18 has been decompressed, the printer 12 prints the bit-mapped image 16.

The compression algorithm 10 may be implemented in the hardware of printer 12 or alternatively, implemented in software, which is executed on a standard processing device within the printer (not shown), such as a microprocessor, for instance. The compression algorithm 10 of the present invention is simple to implement in hardware because it requires few gates, as explained further below, and is less expensive than the memory saved by the smaller frame buffer 14. Thus, the overall cost of the printer 12 is reduced.

Figure 2:
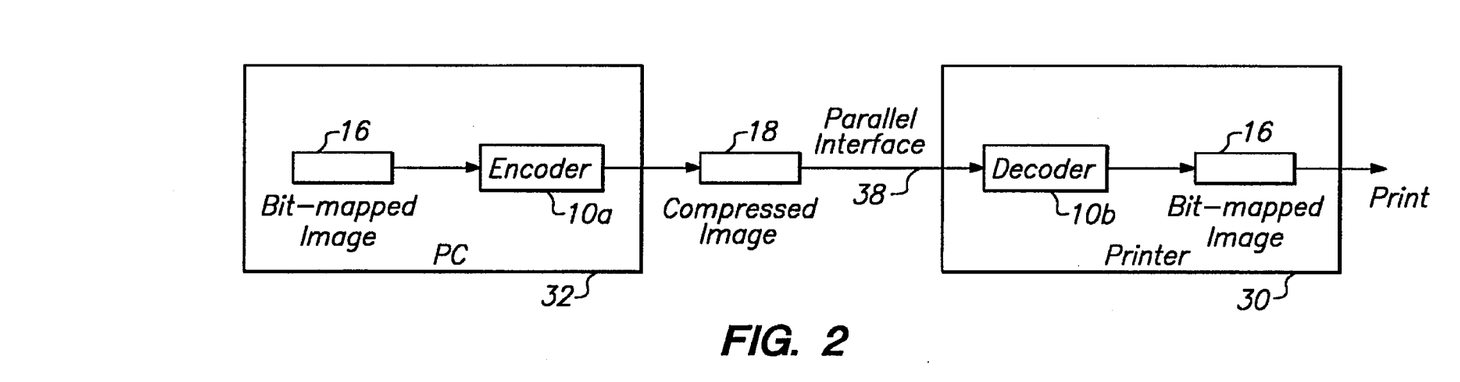
FIG. 2 is a block diagram depicting a data compression algorithm according to a second preferred embodiment of the present invention.

Referring to FIG. 2, a second preferred embodiment of the compression algorithm is shown. In this embodiment, the compression algorithm 10 is used with a "dumb" printer 30 which lacks sufficient processing power to rasterize data before the data is printed. Therefore, the encoder 10a is located on a host processing device, such a PC 32, for example, and the decoder 10b is located in the dumb printer 30. A bit-mapped image 16 which is to be printed, is compressed by the encoder 10a to produce a compressed image 18. Compressed image 18 is then transferred by the PC 32 to the dumb printer 30 via a parallel interface 38 between the PC 32 and the dumb printer 30. Once the compressed image 18 reaches the dumb printer 30, the decoder 10b decompresses the compressed image 18 back into the bit-mapped image 16 which is then printed by the dumb printer 30.

In a preferred embodiment, the encoder 10a is implemented in software and is executed in within the PC 32. The decoder 10b may either be implemented in hardware within the printer 30, or alternatively, implemented in firmware, assuming of course, that the printer 30 contains some form of processor. In contrast with prior art techniques, the simplicity of the encoder 10a dispenses with the requirement for an add-on compression board inside the PC 32. The lack of an add-on compression board reduces the complexity of the compression system and increases compatibility between the printer 30 and the PC 32.

Although the present invention is described herein as relating to printer technology and bit-mapped images, the present invention is also applicable to other areas such as I/O compression, bitmap fore compression, and outline font caching, for example. The compression and decompression methods of the compression algorithm 10 will now be explained in detail below.

The compression algorithm 10 reads a rasterline of an input bit-mapped image 16 and compares the rasterline with the immediately preceding rasterline to check for commonly occurring sequences of bytes. The rasterline currently being read by the compression algorithm 10 is referred to as the current row, and the preceding rasterline to which it is compared is referred to as the reference row. According to the present invention, the current row is compressed by not only identifying a section of bytes in the row that are different from the reference row, as in delta row compression, but also by identifying a section of bytes that are the same as the reference row.

Each input byte in the current row is then represented in the compressed image 18 by one of the following three modes: 1) COPY, 2) REPEAT, or 3) LITERAL mode. The COPY (C) mode indicates that the input byte of the current row is equal to the corresponding byte in the reference row. The REPEAT (R) mode indicates that the input byte of the current row is equal to the previous input byte in the current row. The LITERAL (L) mode indicates that the input byte is not in the above two modes and must therefore be copied as is to the compressed image 18.

Figure 3:
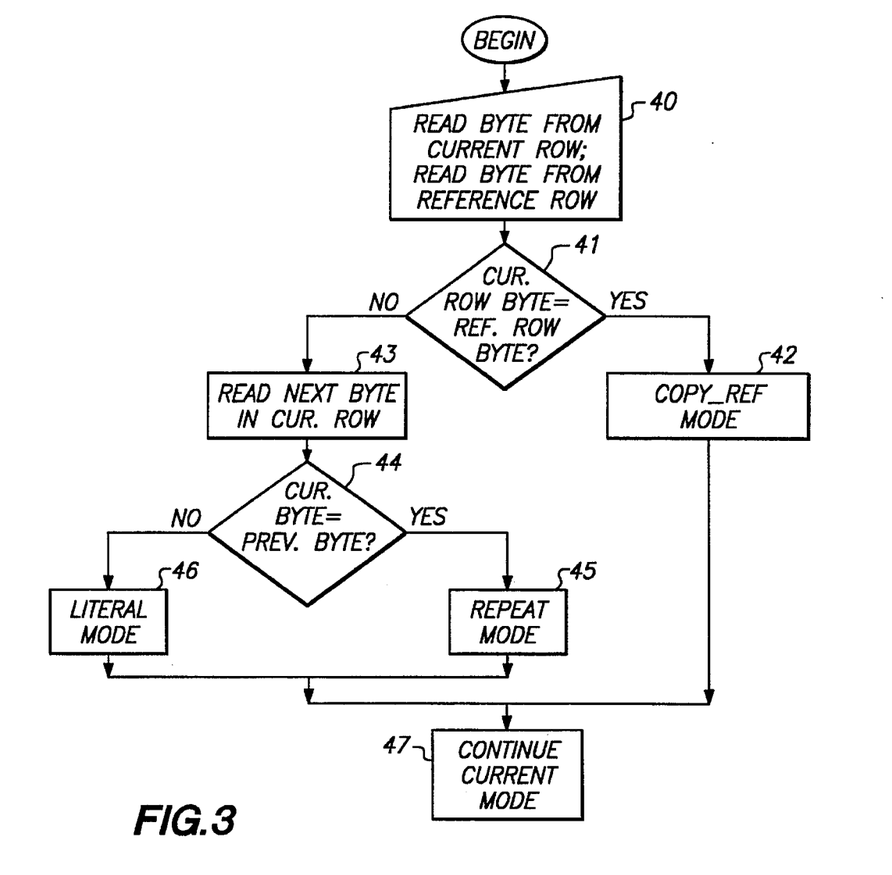
FIG. 3 is a flow chart of the compression process of the compression algorithm.

Referring to FIG. 3, a flow chart of the compression modes of the encoder 10a is shown. The flow chart of FIG. 3 is explained along with reference to FIGS. 1 and 2. For a given current row in a bit-mapped image 16, the encoder 10a begins compressing the row by reading each byte in the current row, and each corresponding byte in the reference row in sequence (step 40). (If the current row is the first row read from the bit-mapped image 16, then the encoder 10a initializes the reference row to all 0's). The encoder 10a then compares the byte from the current row with the corresponding byte in the reference row (step 41). If the byte from the current row is the same as the byte in the reference row, then the encoder 10a encodes the byte as being in the COPY mode (step 42). If the byte is not the same as the byte in the reference row, then the encoder 10a reads the next byte in the current row (step 43), and compares it with the previous byte in the current row (step 44). If the current byte is equal the previous byte, then the encoder 10a encodes the byte as being in the REPEAT mode (step 45). If the current byte is not equal the previous byte, then the encoder 10a encodes the byte as being in the LITERAL mode (step 46).

The mode which is used to encode the current byte, as described above, is the current mode. The current mode continues (Step 47) until a different mode is set. The COPY Mode (Step 42) continues while each byte in the current row matches the corresponding byte in the reference row. The REPEAT mode (Step 45) continues while each byte in the current row matches the preceding byte in the current row. The LITERAL MODE (Step 46) continues while each byte in the current row fails to match the corresponding byte in the reference row and the preceding byte in the current row.

Each time a byte is read from the current row, the encoder checks if the byte is the last byte in the current row. If the byte is the last byte in the current row, then the current row becomes the reference row, and the encoder 10a reads the next row, which becomes the new current row. The process above continues until each rasterline in the bit-mapped image 16 is read and compressed.

According the present invention, for all bytes encoded as being in the COPY mode, the encoder 10a encodes the bytes according to the following mode format:

<COPY mode><n> where COPY mode is the current mode, and n is a count of the number of data bytes to be copied from the reference row.

For all bytes encoded as being in the REPEAT mode, the encoder 10a encodes the bytes according to the following format:

<REPEAT mode><n><data bytes> where REPEAT mode is the current mode, n is a count indicating that the following data byte is to be repeated <n>+1 times, and the data byte is the byte to be repeated.

For all bytes encoded as being in the LITERAL mode, the encoder 10a encodes the bytes according to the following format:

<LITERAL mode><n><data bytes> where LITERAL is the current mode, n is a count indicating how many data bytes follow, and the data bytes are the bytes of data to be copied.

The current row, once compressed contains a sequences of such triplets; a mode code followed by a length code, and optionally followed by one or more data bytes. Below, are example mode sequences:

C 12—indicates that 12 bytes are to be copied from reference row when a new row is created from the reference row;

R 27 'A'—indicates that the byte 'A' is to be repeated 28 times in the new row; and L 7 'ABCDEFG'—indicates that the seven bytes 'ABCDEFG' are to be written directly to the new row.

Figure 4:
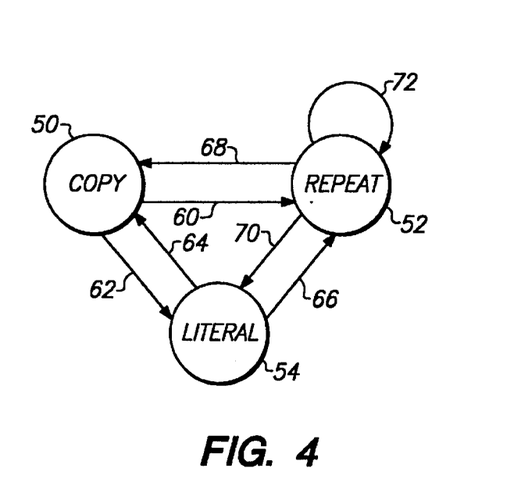
FIG. 4 is a state diagram showing compression transitions between a COPY mode, a REPEAT mode, and a LITERAL mode.

As stated above, a compressed rasterline will include a sequence of mode triplets, one following another. Since the modes freely change from one to another in a row, the transition between each pair of modes in a row is called a mode transition. FIG. 4 is a state diagram showing the possible free mode transitions between the COPY mode 50, the REPEAT mode 52, and the LITERAL mode 54. The COPY mode 50 may transition either to the REPEAT mode 52, shown by the arrow 60, or to the LITERAL mode 54, shown by the arrow 62. The LITERAL mode 54 may transition either to the COPY mode 50, shown by arrow 64, or to the REPEAT mode 52, shown by the arrow 66. The REPEAT mode 52 may transition to the COPY mode 50, shown by the arrow 68; the LITERAL mode 54, shown by the arrow 70; and to itself, shown by the loop arrow 72.

Note that a mode transition from the COPY mode 50 to the COPY mode 50, and a transition from the LITERAL mode 54 to the LITERAL mode 54, will not occur. The COPY mode 50 will not follow a previous COPY mode 50 because a COPY sequence of two differing sets of bytes will be combined to form one COPY sequence. Similarly, a LITERAL sequence of two differing sets of bytes will also combined to form one LITERAL sequence. Thus, the only way to terminate the COPY mode 50 and the LITERAL mode 54 is to change to another mode. This is different from the REPEAT mode 52 in which a REPEAT of one sequence can be followed by another. For example, the byte sequence "AAAABB" would be represented as R 4 'A' followed by R 2 'B'.

According to the present invention, rather than encoding the modes (COPY, REPEAT, LITERAL) directly in the compressed rasterline, further compression is achieved by only encoding the transitions between a current mode and a previous mode. In the mode transition encoding scheme of the present invention, a variable length mode code is assigned to each mode transition.

Figure 5:
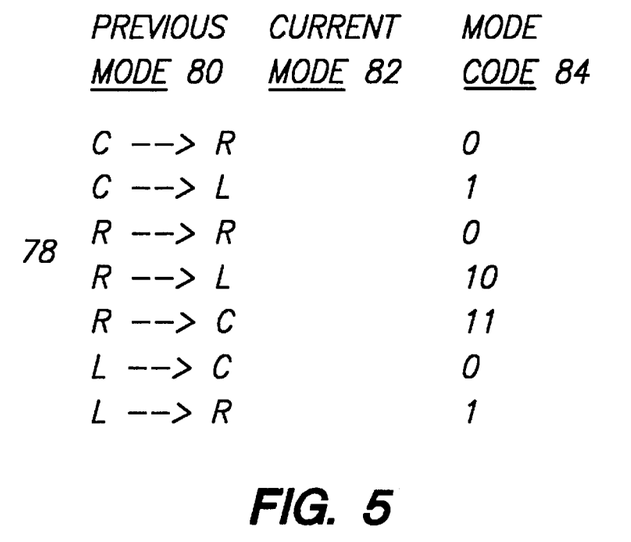
FIG. 5 is a table depicting a mode transition encoding scheme according to the present invention.

Referring to FIG. 5, a preferred embodiment of the mode transition encoding scheme of the present invention is shown. Mode transitions between a current mode 82 and a previous mode 80, are shown generally at 78, and correspond to the mode transitions shown in FIG. 4. The mode transitions 78 may be divided into categories based on the value of the previous mode in each mode transition. For example, all mode transitions where the previous mode is COPY, is one transition category; all mode transitions where the previous mode is REPEAT, is a second transition category; and all mode transitions where the previous mode is LITERAL, is a third transition category.

According to the present invention, each mode transition in a category is assigned a unique corresponding mode code 84. For the transition category where the previous mode is COPY, a mode code of '0' is assigned when the current mode is REPEAT, and a mode code of '1' is assigned when the current mode is LITERAL. For the transition category where previous mode is REPEAT, a mode code of '0' is assigned when the current mode is REPEAT, a mode code of '10' is assigned when the current mode is LITERAL, and a mode code of '11' is assigned when the current mode is COPY. For the transition category where previous mode is LITERAL, a mode code of '0' is assigned when the current mode is COPY, and a mode code of '1' is assigned to when the current mode is REPEAT.

In a preferred embodiment, the mode codes 84 are not explicitly set in the compression algorithm 10, but are rather numerically derived. The mode codes 84 are numerically derived by first enumerating the modes COPY, REPEAT, and LITERAL in order. For example, the COPY mode may be made equal to '0', the REPEAT mode may be made equal to '1', and the LITERAL mode may be made equal to '2'. After the modes are enumerated, mode transitions are classified, using what is called a mode bit, by calculating a modulo function between a previous mode 80 and a current mode 82 in a given mode transition 78. A modulo function is a arithmetic operation whose result is the remainder of a division operation. For example, the equation "2 modulo 3" equals 2, because 2 divided by 3 yields a remainder of 2. In a preferred embodiment, the mode bit is set to either '0' or '1' according the following:

If Current Mode = (Previous mode + 1) Modulo 3
   then mode bit = 0
Else if Current Mode = (Previous mode + 2) Modulo 3
   then mode bit = 1

After the mode bit is set, then the mode code 84 is determined by the following logic:

If Previous Mode = REPEAT
   and if Current Mode = REPEAT
      then mode code = 0
   else mode code = mode bit + 2 (In a transition from
REPEAT mode to LITERAL mode, the mode bit equals 0.
Therefore, the mode code equals (0 + 2 = 2) which is
binary '10.' Similarly, in a transition from REPEAT mode
to COPY mode, the mode bit equals 1. Therefore, the mode
code equals (1 + 2 = 3) which is binary '11'.)

When the first rasterline of a bit-mapped image 16 is read, the REPEAT mode is set as the initial previous mode, since the REPEAT mode is the only mode that can transition to all three modes. In addition, the continuity of a mode will not be interrupted by the end of the current row. That is, row boundaries do not affect the compression process except to signal the reading of a new row and to update the reference row.

As stated above, each mode code may be followed by a count <n> of the number of data bytes which follow. According the present invention, the counts are also represented in a compressed rasterline as a variable-length code.

Figure 6:
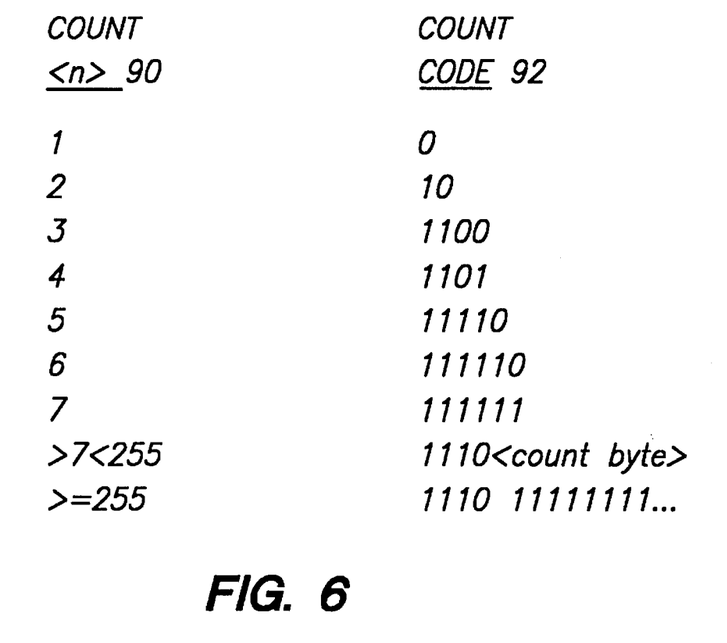
FIG. 6 is a table depicting a count encoding scheme according to the present invention.

Referring to FIG. 6, a preferred embodiment of the count encoding scheme of the present invention is shown. Each count <n>90, representing the number of data bytes in a mode, is encoded by a variable-length count code 92. For example, in the mode triplet R 5 'A', the count five represents that the date byte 'A' is to be repeated six times (n+1), and the count would be replaced with the count code of '11110.'

As shown, when the count 90 is greater than seven and less than 255, a count code of '1110' followed by a count byte (the actual number of bytes) is used to represent the count 90. When the count 90 is greater than or equal to 255, n/255+1 bytes are used to represent the count 90, among which, the first n/255 bytes are 0xff (hexadecimal 255) and the sum of all bytes is n.

Referring again to FIGS. 1 and 2, during compression, the encoder 10a arranges the compressed data such that the decoder 10b can fetch the next byte in a compressed rasterline whenever the encoder 10a requires a byte for decoding. In the compressed rasterline, the variable-length mode codes 84 and the variable-length count codes 92 are grouped into bytes while data bytes follow in natural order. The variable-length mode codes 84 include the bits (0, 1, 10, 11), and the variable-length count codes 92 include the set (0, 10, 1100, 1101, 1110, 11110, 111110, 111111). The data bytes include the following: 1) the bytes following a REPEAT mode code, 2) the bytes following a LITERAL mode code, and 3) the count bytes following the count code 1110 (when the count is greater than 7 and less than 255).

Figure 7:
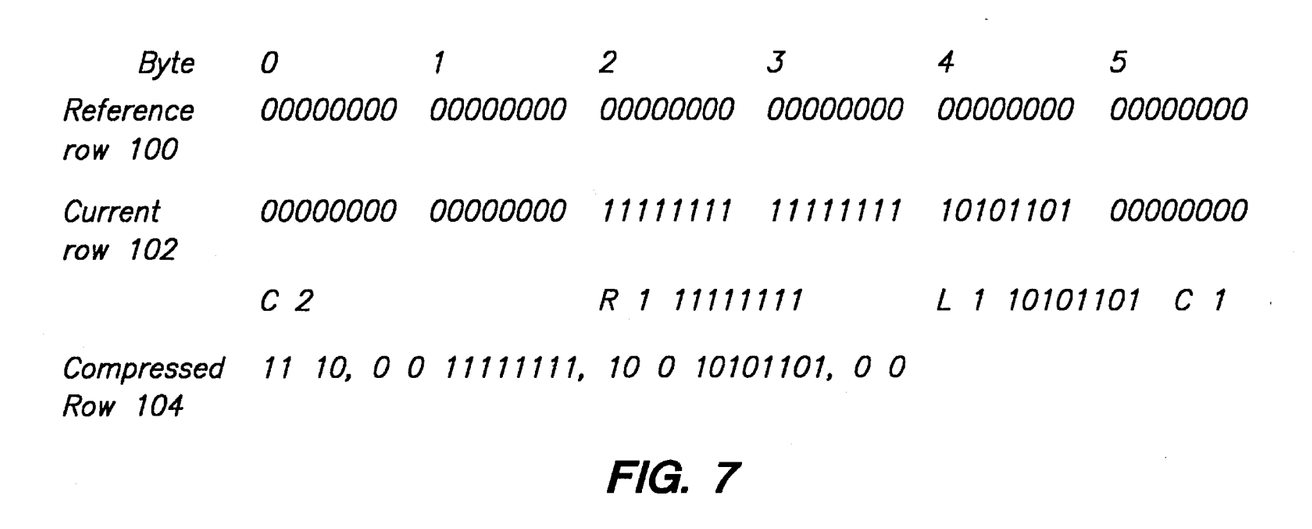
FIG. 7 is an illustrative example of how the encoder of the present invention compresses a current row of a bit-mapped image into a compressed row given a reference row.

FIG. 7 is an example of how the encoder 10a of the present invention compresses a current row 102 of a bit-mapped image into a compressed row 104 given a reference row 100. For the purpose of this example, the reference row 100 contains all zeros and only six bytes (0, 1, 2, 3, 4, 5,) in the current row 102 and reference row 100 are shown. The commas shown in the compressed row 104 are for reference only, and delimit separate mode sequences.

Since the first two bytes in the current row 102 are the same as the corresponding bytes in the reference row 100, the current mode is COPY. As stated above, the default previous mode is REPEAT mode, therefore the first set of bits '11' in the compressed row 104 is a mode code indicating a mode transition from REPEAT to COPY. The following set of bits '10' is a count code, indicating that two bytes are to by copied from the reference row 100.

Because byte two in the current row 102 is different than the byte three in the reference row 100, and is the same as byte 3 in the current row 102, byte two in the current row 102 may be repeated. The second mode code '0' in the compressed row 104 indicates a mode transition from COPY to REPEAT (see FIG. 5). The next set of bits '0' is a count code indicating that the following data byte '1111111', is to be repeated twice (n+1).

Byte four in the current row 102 is not the same as byte four in the reference row 100, and does not repeat, so the byte four must be copied directly to the compressed row 104. The mode code '10' represents the mode transition from REPEAT to LITERAL (see FIG. 5), and the next bit '0' is a count code indicating the following byte '10101101' is to be copied directly when the compressed row 104 is decompressed.

Byte five in the current row 102 is identical to the corresponding byte in the reference row 100 and may be copied from the reference row 100. The bit '0' is a mode code indicating a transition from LITERAL to COPY mode (see FIG. 5), and the next bit '0' is count code indicating that one byte from the reference row 100 is to be copied twice (n+1).

The present invention provides compression ratios which are better than delta row compression. The set of variable-length mode codes and count codes described above in a preferred embodiment of the present invention are not optimal for all images. However, they have been found to be quite effective for images that are likely to be printed on a printer including text and graphics. Other sets of codes may be used for different images. Furthermore, an image can be divided into bands such that each band uses one set of codes. A code index at the beginning of the decompressed row for a band can then be used to indicated the variable-length codes.

The worst compression case for the compression algorithm 10 is when all bytes in the current row are in the LITERAL mode. In this case n bytes are expanded to n+0.5+(n/255)+1 bytes, representing a size increase over the reference row by approximately about 0.4 percent.

Figure 8:
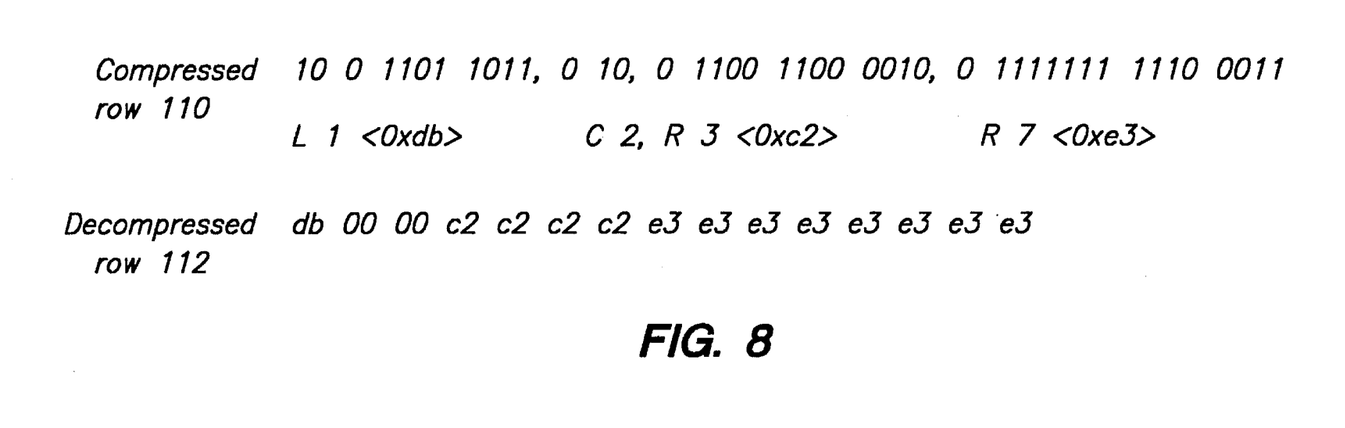
FIG. 8 is an illustrative example of how the decoder decompresses a compressed row back into the original decompressed row.

Referring to FIG. 8, an example of how the decoder 10b (FIG. 1) decompresses a compressed row 110 into a decompressed row 112. The data bytes in this example are shown in hexadecimal and, although not shown, the reference row is all zeros, as in the previous example. Also, as in FIG. 7, each mode sequence in the compressed row 110 is separated by a comma for reference.

The first mode sequence contains a '10' mode code and a count code of '0' (1 byte). Since previous mode is initially set to REPEAT, the mode code '10' indicates a mode transition from REPEAT to LITERAL mode (see FIG. 5). This mode sequence instructs the decoder to copy the single data byte '1101 1011', which is db in hexadecimal, directly to the decompressed row 112.

The second mode sequence contains a '0' mode code and a count code of '10' (2 bytes). Since the previous mode was LITERAL, the mode code '0' indicates a mode transition from LITERAL to COPY (see FIG. 5). This mode sequence instructs the decoder to copy two bytes from the reference row, which are all zero, to the decompressed row 112.

The third mode sequence contains a '0' mode code and a count code of '1100' (3 bytes). Since the previous mode was COPY, the mode code '0' indicates a mode transition from COPY to REPEAT mode (see FIG. 5). This mode sequence instructs the decoder to copy the data byte '1100 0010', which is c3 in hexadecimal, to the decompressed row 112 four times.

The fourth mode sequence contains a '0' mode code and a count code of '1111111' (7 bytes). Since the previous mode was REPEAT, the mode code '0' indicates a mode transition from REPEAT to REPEAT mode (see FIG. 5). This mode sequence instructs the decoder to copy the data byte '1110 0011', which is e3 in hexadecimal, to the decompressed row eight times.

Referring again to FIGS. 1 and 2, the decoder 10b, which decodes mode codes and count codes, can be implemented easily in hardware with very few gates (because there are not many states). The decompression speed is mainly bounded by the memory access time. Therefore, the compression algorithm 10 of the present invention should render slightly faster decompression rates than Delta Row compression. This is due in part because the compression algorithm 10 has a higher compression ratio and thus fewer memory accesses. The compression algorithm 10 also includes a fast compression rate. On a Pentium processor manufactured by Intel Corporation, for example, the compression algorithm 10 is capable of compressing three Megabytes of data per second.

In sum, a compression method and system has been disclosed that provides fast compression and decompression rates due to byte-oriented processing, is simple to implement in software or hardware, and has a worst case expansion is only 1/255 or 0.4%.

The foregoing descriptions of specific embodiments of the present invention have been presented for purposes of illustration and description. They are not intended to be exhaustive or to limit the invention to the precise forms disclosed, and it should be understood that many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A computer-based method for compressing bit-mapped data arranged in rows of bytes including a current row and a reference row, wherein each of said bytes in said current row is compared with a corresponding byte in said reference row, said method comprising the steps of:

characterizing each of said bytes in said current row as being in a copy mode if said byte is equal to said corresponding byte in said reference row;

characterizing each of said bytes in said current row as being in a repeat mode if said byte does not equal said corresponding byte in said reference row and said byte equals the next byte in said current row;

characterizing each of said bytes in said current row as being in a literal mode if said byte does not equal said corresponding byte in said reference row and said byte does not equal the next byte in said current row;

assigning a variable-length mode code to each transition from one of said modes to another one of said modes; and representing said current row by one or more of said variable-length mode codes to provide a compressed row of said data.

2. A method as is in claim 1 further including the step of providing a variable-length count code after each one of said variable-length mode codes in said compressed row wherein said variable-length count code represents how many of said bytes are associated with said variable-length mode code.

3. A method as is in claim 2 further including the step of representing said compressed row of data as a plurality of mode sequences wherein each of said mode sequences includes one of said variable-length mode codes followed by one of said variable-length count codes followed by particular ones of said bytes from said current row.

4. A method as is in claim 1 wherein said step of assigning said variable-length mode codes includes assigning one of said variable-length mode codes to each transition between:

said copy mode to said repeat mode, said copy mode to said literal mode, said repeat mode to said repeat mode, said repeat mode to said literal mode, said repeat mode to said copy mode, said literal mode to said copy mode, and said literal mode to said repeat mode.

5. A system for compressing bit-mapped data arranged in rows of bytes including a current row and a reference row, wherein each of said bytes in said current row is compared with a corresponding byte in said reference row, said system comprising:

mode setting means for setting one of a plurality of modes states based on a comparison of said each of said bytes with said corresponding byte in said reference row, said mode setting means including mode transition means for recording each mode transition from said one of said plurality of modes to another of said plurality of modes in said current row;

count means for providing a count of how many of said bytes are associated with each of said plurality of modes set by said mode setting means in said current row;

mode encoding means for encoding each of said mode transitions as a variable-length mode code;

count encoding means for encoding each of said counts as a variable-length count code;

format means for creating a mode sequence for said bytes in said current row, each of said mode sequences comprising one of said variable-length mode codes, one of said variable-length count codes, and, at least one of said bytes from said current row if said at least one of said bytes are copied from said current row; and output means for creating a compressed row of said data from said mode sequences.

6. A system as in claim 5 wherein said system further includes decompression means for decompressing said compressed row of said data.

7. A system as in claim 6 wherein said system is located in a printer having a frame buffer memory and wherein said bit-mapped data is a bi-level bit-mapped image, said system functioning to compress said bit-mapped image before said printer stores said bit-mapped image in said frame buffer, thereby reducing the memory requirement of said printer.

8. A system as in claim 7 wherein said system is located in a host computer having a parallel interface and said decompression means is located in a printer, and wherein said bit-mapped data is a bi-level bit-mapped image which is compressed in said host computer and transferred to said printer over said parallel interface and decompressed by said decompression means in said printer, thereby increasing dam throughput over said parallel interface.

9. A computer-based method for compressing bit-mapped data arranged in rows of bytes, said method comprising the steps of:

providing a plurality of modes;

defining a plurality of transition states between said plurality of modes;

representing said plurality of transition states by a plurality of variable-length mode codes;

comparing a first row of bytes with a second row of bytes on a byte-by-byte basis;

representing each respective group of bytes in said first row that match corresponding bytes in said second row by a first mode sequence, said first mode sequence including a first one of said variable-length mode codes, and a first count indicating how many of said bytes are contained in said respective group of bytes;

when a first byte does not match said corresponding byte in said second row, determining if said first byte repeats in said first row;

if said first byte repeats in said first row, representing said first byte by a second mode sequence, said second mode sequence including a second one of said variable-length mode codes, a second count indicating how many times said first byte repeats in said first row, and said first byte;

if said first byte does not repeat in said first row, representing said first byte by a first mode from said plurality of modes, determining how many successive ones of said bytes in said first row are represented by said first mode, grouping said bytes represented by said first mode, and representing said group of bytes by a third mode sequence, said third mode sequence including a third one of said variable-length mode codes, a third count indicating how many of said bytes are included in said group of bytes represented by said first mode.

10. A computer-based method as in claim 9 further including the step of representing said first count, said second count, and said third count by a variable-length count code.

11. A computer-based method as in claim 10 wherein said step of providing a plurality of modes provides a copy mode, a repeat mode, and a literal mode.

12. A printer for compressing and decompressing bit-mapped data arranged in rows of bytes including a current row and a reference row, wherein each of said bytes in said current row is compared with a corresponding byte in said reference row, said printer comprising:

- encoding means for compressing said bit-mapped data into compressed data, said encoder means including;
    - mode setting means for setting one of a plurality of modes states based on a comparison of said each of said bytes with said corresponding byte in said reference row, said mode setting means including mode transition means for recording each mode transition from said one of said plurality of modes to another of said plurality of modes in said current row,
    - count means for providing a count of how many of said bytes are associated with each of said plurality of modes set by said mode setting means in said current row,
    - mode encoding means for encoding each of said mode transitions as a variable-length mode code,
    - count encoding means for encoding each of said counts as a variable-length count code, and
    - format means for creating a mode sequence for said bytes in said current row, each of said mode sequences comprising one of said variable-length mode codes, one of said variable-length count codes, and, at least one of said bytes from said current row if said at least one of said bytes are copied from said current row;
- storage means for storing said compressed data; and
- decoding means for decompressing said compressed data prior to printing.

13. A system for compressing and decompressing bit-mapped data arranged in rows of bytes including a current row and a reference row, wherein each of said bytes in said current row is compared with a corresponding byte in said reference row, said system comprising:

- a computer including encoding means for compressing said bit-mapped data into compressed data, said encoder means including;
    - mode setting means for setting one of a plurality of modes states based on a comparison of said each of said bytes with said corresponding byte in said reference row, said mode setting means including mode transition means for recording each mode transition from said one of said plurality of modes to another of said plurality of modes in said current row,
    - count means for providing a count of how many of said bytes are associated with each of said plurality of modes set by said mode setting means in said current row,
    - mode encoding means for encoding each of said mode transitions as a variable-length mode code,
    - count encoding means for encoding each of said counts as a variable-length count code, and
    - format means for creating a mode sequence for said bytes in said current row, each of said mode sequences comprising one of said variable-length mode codes, one of said variable-length count codes, and, at least one of said bytes from said current row if said at least one of said bytes are copied from said current row;
    - transmitting means for transmitting said compressed data; and
- a printer including receiving means responsive to said transmitting means for receiving said compressed data, and decoding means for decompressing said compressed data prior to printing.

* * * * *

UNITED STATES PATENT AND TRADEMARK OFFICE
CERTIFICATE OF CORRECTION

PATENT NO.    : 5,617,517
DATED         : April 01, 1997
INVENTOR(S)   : Shan Chi It is certified that an error appears in the above identified patent and that said Letters Patent is hereby corrected as shown below:

Column 12, line 33, change "dam" to --data--.

Signed and Sealed this

Tenth Day of June, 1997

Attest:

BRUCE LEHMAN

Attesting Officer    Commissioner of Patents and Trademarks